US007771814B2

(12) United States Patent
Grimble et al.

(10) Patent No.: US 7,771,814 B2
(45) Date of Patent: Aug. 10, 2010

(54) FORMER FOR PAVEMENT-LIKE SITES

(75) Inventors: Terry L. Grimble, Aurora, CO (US); L. Russell Ingersoll, Granite Bay, CA (US)

(73) Assignee: Sustainable Paving Systems, LLC, Granite Bay, CA (US)

( * ) Notice: Subject to any disclaimer, the term of this patent is extended or adjusted under 35 U.S.C. 154(b) by 737 days.

(21) Appl. No.: 11/599,503

(22) Filed: Nov. 13, 2006

(65) Prior Publication Data

US 2008/0113161 A1 May 15, 2008

(51) Int. Cl.
*B32B 3/00* (2006.01)
*E01C 5/00* (2006.01)
*E01C 7/00* (2006.01)
*B22C 9/22* (2006.01)

(52) U.S. Cl. .................... 428/156; 428/213; 428/537.5; 404/42; 404/44; 249/2; 249/16; 249/35; 249/55; 249/61; 249/189

(58) Field of Classification Search ................ 428/34.2, 428/174, 178, 532, 537.1, 537.5, 156, 213; 404/47, 74, 34, 42, 44, 46; 249/2, 16, 35, 249/55, 189, 61; 206/521.1–521.9; 52/311.1, 52/314, 316
See application file for complete search history.

(56) References Cited

U.S. PATENT DOCUMENTS

| | | | | |
|---|---|---|---|---|
| 3,664,241 | A | 5/1972 | Blackburn | |
| 3,802,790 | A | 4/1974 | Blackburn | |
| 4,994,148 | A | 2/1991 | Shetka | |
| 5,362,776 | A * | 11/1994 | Barenberg et al. | 524/35 |
| 6,128,889 | A * | 10/2000 | Fuss | 53/472 |
| 6,237,294 | B1 * | 5/2001 | Rygiel | 52/314 |
| 6,830,658 | B2 | 12/2004 | Kumamoto et al. | |

FOREIGN PATENT DOCUMENTS

WO WO 02/064349 A1 8/2002

* cited by examiner

*Primary Examiner*—Donald Loney
(74) *Attorney, Agent, or Firm*—Morrison & Foerster LLP

(57) ABSTRACT

A former, process for making same, process for using same, and resulting pavement-like site, where the former is a one-time use structure made of wood fiber or paper pulp molded into a rigid shape and defining a plurality of hollow peak-like structures extending from a base sheet. Each peak is substantially closed at its extremity away from the base sheet and open at the extremity at the base sheet. This former is used for installing combination pavement and dirt/gravel surfaces such as those known under the tradename Grasscrete®.

4 Claims, 2 Drawing Sheets

FORMER FOR PAVEMENT-LIKE SITES

FIELD OF THE INVENTION

This disclosure relates in general to formers primarily for use in the construction of pavement-like sites, and in particular formers which are void forming molds for the construction of concrete surfaces. This disclosure also relates to the method for making the formers, the method for using the formers to make a pavement-like site, and the resulting pavement-like site.

DESCRIPTION OF PRIOR ART

Formers and methods for making pavement-like sites are well known in the field. See U.S. Pat. No. 3,664,241, inventor BLACKBURN; U.S. Pat. No. 3,802,790, inventor BLACKBURN; and International Application Publication WO 02/064349A1, inventor HOWDEN, all incorporated herein by reference in their entireties.

Briefly, known in the art is the pavement system known by the tradename Grasscrete®. Grasscrete and similar pavements are concrete pavements used outdoors and created using cast-in-place super plasticized concrete, frequently reinforced with steel reinforcement and defining voids. This produces a series of interconnected concrete pillars and void spaces. Typically the void spaces are filled with soil from which grass grows or filled with other water pervious materials, such as gravel, after curing of the concrete. The resulting pavement has structural strength and integrity to support heavy vehicles, including fire engines or heavy trucks, yet allows storm and irrigation water to percolate down through the voids in the concrete into the ground and not run off into the storm drain system, due to the presence of the voids. Also, the resulting surface looks mostly like grass.

There are two types of formers (molds) for forming the concrete that are used in producing Grasscrete or similar pavement-like sites. See Blackburn U.S. Pat. No. 3,802,790, referred to above. The first is the reusable or withdrawable former which is, in the U.S., a 2'×2'×6" hard plastic mold, a number of which are set side by side in areas of approximately 500 to 800 square feet inside a perimeter form and filled with concrete. Just prior to the final set of the concrete, while the concrete is still in its plastic phase, the formers are pulled out from the concrete. This process is repeated, for instance several times in a working day, for a total production rate of typically 1,000-1,600 square feet of pavement per day per site. These reusable formers are sturdy and can support the weight of workmen and wheelbarrows of concrete, whereby boards are typically laid crossed the formers and the men walk across the boards and wheel the wheelbarrows of concrete with them. These formers are relatively expensive to purchase and require the installer to have a trailer and similar equipment to transport them to and from the job site, and a place to store them when not in use.

After the concrete has cured, for instance several weeks, the voids left behind by the formers are filled with soil in which grass is planted, or gravel or seashells or other water porous material. The formers may be made, in addition to plastic, of metal fiber or plastic material and can have a variety of shapes resembling for instance an egg tray, such as shown in present FIG. 1, the same as FIG. 1 of U.S. Pat. No. 3,802,790. The formers 11 serve to define spaces receiving a first site material such as the concrete and a second site material such as the soil. The contours of the formers can be of various sizes, depths and widths with rectangular, square, circular or diagonal peaks 12. In FIG. 1, each former 11 includes a generally planar base sheet 9 having upper and lower surfaces 9*a* and 9*b* respectively and a plurality of outstanding hollow close peaks 12 extending outwardly from the surface 9*a*. Peaks 12 are all of approximately the same height and open outwardly of the surface 9*b*. Thus the open bases of the peaks 12 are interconnected by the base sheet 9, which represents a connecting web for the individual peaks 12.

FIG. 2 (same as FIG. 4 of U.S. Pat. No. 3,802,790) shows the former in use in a cutaway side view. The upper extremity of each peak is substantially closed by a top wall 16 so that the sidewalls 12*a* of the peaks 12, the top walls 16 and the base sheet 9 present a generally continuous barrier disposed between and separating a first space 33, including internal hollow spaces within the peaks 12, and a second space 32 generally surrounding the peaks 12. The soil 10 supports the former 11, and concrete 13 has been poured into the voids 32. In this version, the peaks 12 are of frusto-conical configuration with the sidewalls 12*a* tapering inwardly from the base sheet 9 so that the walls 16 are smaller than the open bases of the peaks 12 adjacent to base sheet 9. The sidewalls 12*a* of the peaks are formed with a series of depressions 12*b* in this version, for purposes of strength. In another version, the peaks may be of generally square shape but with sidewalls which curve outwardly. The formers 11 serve to define spaces for receiving the site materials of the different character from one another in a site made in accordance with the process, and the formers 11 separate these materials.

As described in U.S. Pat. No. 3,802,790, the formers can be made from a low-cost self or chemically disintegrable material, or from materials which are more permanent. For the above-described reusable formers, a permanent type material is used. When the formers are to be used only one-time they are left in place after being laid down. This is also referred to as a one-time use former. They are typically made from thin injection molded plastic and placed inside the perimeter forms. The concrete is poured in the formers and leveled off, using brooms or rakes. After the concrete is at least partly cured to hold the weight of the workmen, the plastic peak tops are burned or melted off using, for instance, a propane torch so as to expose the voids within each peak of each former. The plastic melts away, producing smoke as the plastic is burned. After the voids are thereby exposed they are filled with top soil and grass seed, or gravel or seashells or other porous material. The base sheet of the formers and the former peak sidewalls are left in place.

Generally the formers have the same configuration for both reusable and one-time use, except that the one-time use formers are, as indicated above, relatively thin and fragile. Generally in the United States one-time use formers are less popular. The one-time use formers are more popular in Europe. The reusable formers have significant disadvantages in terms of the needed capital investment and the need to transport them both ways. The one-time use formers also have disadvantages in terms of installation, since they cannot support the weight of the workmen or wheelbarrows full of concrete and hence the production of the site is relatively slow, unless scaffolding is provided. Typically the present one-time use formers are made from a web of plastic sheet material subject to heating and vacuum forming to assume the desired shape, see International Patent Application WO 02/064349A1, incorporated herein by reference in its entirety. (The production of the formers is done at a plastic molding facility.) The one-time use formers as presently used involving plastic material do undesirably produce smoke and fumes during the burning process also.

In either version, it is common to provide a web of steel reinforcing rods in the concrete portion of the structure for greater strength. In some cases these steel reinforcements are provided in the form of a mesh.

The soil portion of the finished paved site may be, for instance, top soil in which grass is seeded, or soil pre-mixed with seeded grass, or non-grass material, such as gravel or crushed seashells or small natural turf divots, i.e. sod, placed in the voids. In some cases the formers, instead of being laid directly on subsoil, are laid on a more rigid base such as a concrete raft.

SUMMARY

In accordance with the invention, an improved former is provided for one-time use. Instead of being made out of plastic as described above, the improved former is made of recycled paper or wood fiber pulp molded into the requisite former shape. This former is used identically to the current plastic one-time use formers in constructing the Grasscrete site, but overcomes shortcomings of both the current one-time use formers and the current reusable formers. First, no capital investment is necessary since the formers are purchased as needed and delivered directly to the job site and paid for by the ultimate customer so that the installer need not invest in reusable formers. The improved formers made of, for instance, recycled paper pulp are environmentally friendly and do not require any burning to open up the voids. Instead the voids can be opened up by easy cutting or by application of water followed by power-washing, since the former material is water soluble. The improved formers are relatively strong unlike the very thin walled current one-time use plastic formers. Thus like the current reusable formers, they support the weight of workmen and wheelbarrows full of concrete without the need for scaffolding. This improves the production rate and hence reduces labor costs. The ultimate Grasscrete installation is identical in appearance to that in accordance with the current formers of either type.

The general size and shape of the improved formers is in some respects substantially the same as the prior art-type formers. The improved formers are of a different material and typically thicker walled than the current one-time use formers. Typically, the improved formers can support a weight of approximately 10 to 20 pounds per square inch, which is more then adequate for the above-described typical installation. A typical wall thickness, both of the base sheet and of the sidewalls of the peaks, is in the range of ⅛ to ½ inches (3 to 12 mm). The recycled pulp paper product which is typically the material in the improved formers is water soluble and hence the openings or voids can be made merely by hosing down the exposed tops of the formers after the concrete has been poured and power washing away the tops of the peaks.

DETAILED DESCRIPTION

Figure 1:
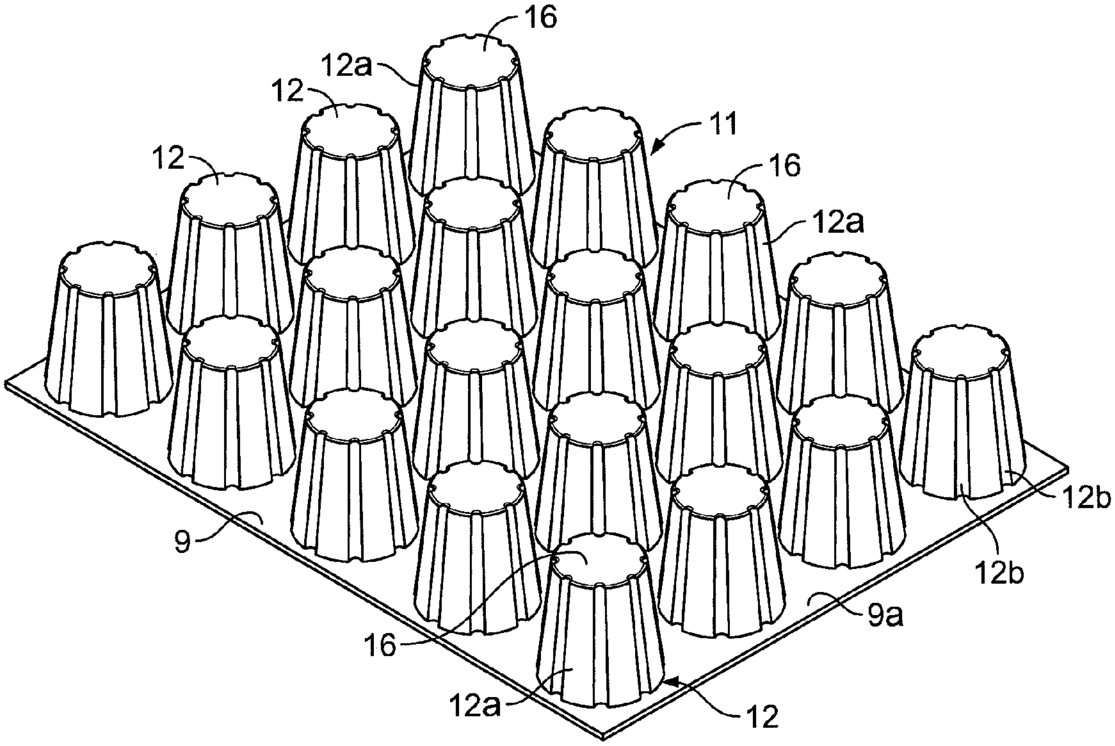
FIG. 1(Prior Art)
FIG. 1 shows a prior art former.
Figure 2:
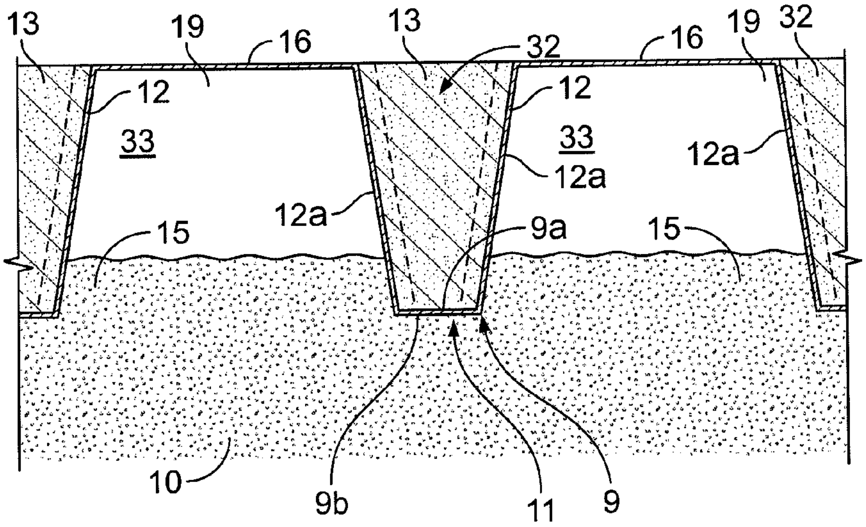
FIG. 2(Prior Art)
FIG. 2 shows in the prior art use of formers, in cross section.
Figure 3:
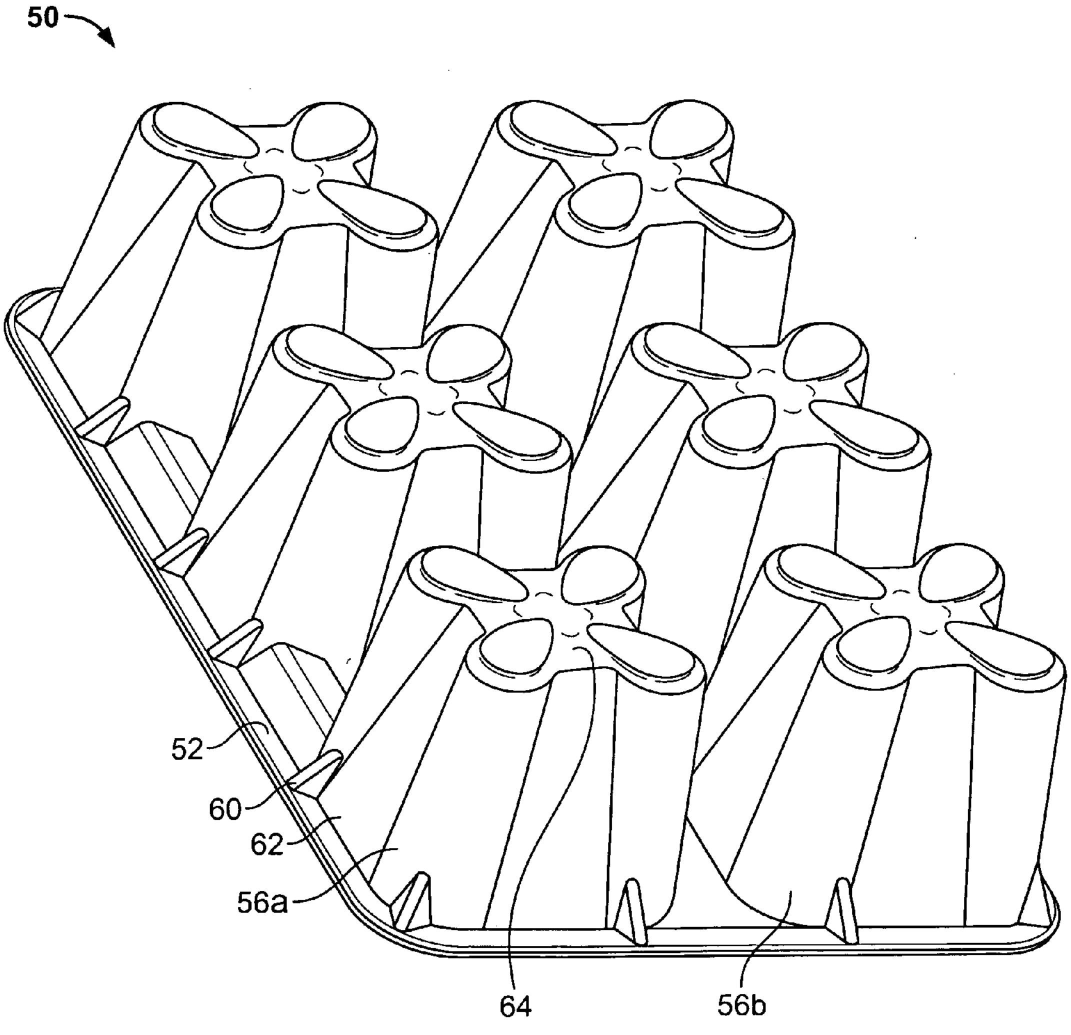
FIG. 3 shows a perspective view of an improved former.

FIG. 3 shows an improved former 50 in accordance with the present invention which differs in several aspects in this particular embodiment from the prior art one-time use formers. The following are among the differences: the walls 62 of peak 56*a*, 56*b*, etc. are thicker, to support weight during installation, ribbing 60 is present which is produced as part of the molding process and which extends from the base sheet 52 to the sidewall 62 of each peak 56*a*, and the overall size of the base sheet 52 is larger in terms of surface area (length/width). Also, the improved former is substantially heavier than the prior art one-time use formers, which makes it easier to handle during installation due to being less subject to being blown by the wind, and also less likely to be displaced by the pouring of the concrete. Additionally, where only part of a former is needed (such as a corner or edge or irregular boundary) the improved former can be broken, while the prior art former must be cut with a knife. Note also that typically the tops 64 of the peaks are thicker for greater mechanical strength than the peak sidewalls 62.

Production of the improved former is by using a conventional molding process. Molding of recycled paper pulp or wood fiber products is known in the field. See, for instance, U.S. Pat. No. 4,994,148, inventor SHETKA incorporated herein by reference in its entirety, which discloses a method for recycling wood fiber products, in particularly newspaper-type pulp, into a molded product. A quantity of paper to be recycled is mixed with sufficient water to form a viscous pulp or slurry by heating the pulp to a desired consistency for a given texture of the product to be made. A pulp press is employed which has a molding chamber with interior sidewalls comprised of a rigid screen through which water can pass and a rigid plate outboard from the screen. The rigid plate defines channels formed therein facing the screen, through which channels water can flow. One of the sidewalls is moveable into the molding chamber to serve as a piston. Means to drive the moveable sidewall, such as a hydraulic jack, completes the press. The beaten pulp is poured into the molding chamber. The chamber is then closed, and the press operated by moving the moveable sidewall into the chamber to compress the beaten pulp to the desired pressure and pulp density. Water and air are forced out of the slurry through the screens and into the rigid plate channels to drain away. The compressed pulp product is then dried to thereby yield a new pulp paper product.

Of course in accordance with the present invention, the shape of the mold is such as to produce a former 50 of the type shown in FIG. 3. It has been found that for the molding process, the mold preferably has greater draft than the mold for making prior art one-time use formers, due to the differences between wood/paper pulp molding and plastic vacuum molding. Note ribbing 60. Details of the mold will be apparent to one of ordinary skill in the art from the intended resulting molded product 50. In accordance with the invention, it has been found that a typical wall thickness of the sidewalls of the peaks in the former is in the range of ⅛ to ½ inches but this is not limiting. A typical height of the former is 5½ inches (140 mm) to match standard US size dimension forming planed wood planks (2 inch by 6 inch.). The diameter of the peaks at the base sheet 52 and at their tops 64 is a matter of design choice. An overall size of the former is typically 2'×4' feet (51 cm×102 cm). In comparison, prior art reusable formers are usually 2'×2', so the present larger size is advantageous for quicker installation. Another suitable method for producing pulp molded products is shown in U.S. Pat. No. 6,830,658, inventors KUMAMOTO et al., incorporated by reference in its entirety similarly using a pulp slurry forced into a mold cavity where the pulp is pressed to remove the excess water and then dried. Commercial equipment to make such pulp molded products is well known and commercially available. Also there are vendors which will make such products upon order, such as Keiding, Inc. of Milwaukee, Wis.

Note that while recycled paper may be used for economy and environmental sensitivity, instead virgin wood or paper pulp may be used. Since the formers after use are not visible, the remaining sidewalls being buried in the resulting pavement site, use of recyclable materials is generally preferred if only for economic reasons. Of course, since the improved formers are water soluble paper products, they must be stored and transported under cover and installed in dry conditions, that is when it is not raining or snowing. This may be overcome by providing a waterproof film over the surface of the former. This would make removal of the tops of the peaks more difficult since the former would no longer be water soluble and the peaks would have to removed by cutting for instance. Hence contemplated in accordance with the invention is the former, as described, made of recycled or other paper or wood fiber pulp.

Also contemplated in accordance with the invention is a method of making the former using the above-described method of pulp molding. Also contemplated is the method of making the pavement-like site installation using the improved former. Also contemplated is the resulting pavement-like site with the concrete and dirt or other material installed and with the residual portions of the formers still in place, including the base sheet and the sidewalls of each peak. Of course the former itself is typically not visible in the finished pavement site since the soil or other material provided in the voids hides the upper surfaces of the peak sidewalls.

This disclosure is illustrative and not limiting; further embodiments will be apparent to one skilled in the art in light of this disclosure and are intended to fall within the scope of the appended claims.

What is claimed as new and desired to be protected by Letters Patent of the United States is:

1. A one-time use former for construction of pavement-like sites, comprising:

a generally planar base sheet having a plurality of hollow peaks extending therefrom, each peak being substantially closed at its extremity distal from the base sheet and open at its extremity at the base sheet wherein the extremity of each peak is thicker than sidewalls of each peak and ribbing extends from the base sheet to the sidewall of each peak;

wherein the former is substantially comprised of paper or wood fiber molded into a rigid structure and, at least at the distal extremity of each plate, being water soluble.

2. The former of claim 1, wherein the former, when installed on a base, has strength sufficient to support the weight of at least 10 pounds per square inch.

3. The former of claim 1, wherein the sidewalls of the former have a thickness of at least ⅛ inch.

4. The former of claim 1, each peak being uniform in size and shape and arranged in a pattern on the base sheet.

* * * * *